(12) United States Patent
Pellen

(10) Patent No.: US 8,141,260 B2
(45) Date of Patent: Mar. 27, 2012

(54) CABLE FLEET ANGLE SENSOR

(75) Inventor: Alain Pellen, Boca Raton, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 271 days.

(21) Appl. No.: 12/368,108

(22) Filed: Feb. 9, 2009

(65) Prior Publication Data

US 2010/0201970 A1  Aug. 12, 2010

(51) Int. Cl.
*B65H 54/28* (2006.01)
*G01B 3/00* (2006.01)

(52) U.S. Cl. .................................. 33/366.24; 33/772

(58) Field of Classification Search ............... 33/366.24, 33/366.25, 732, 735, 736, 739, 150, 754, 33/761, 763, 772, 773, 775
See application file for complete search history.

(56) References Cited

U.S. PATENT DOCUMENTS

| | | |
|---|---|---|
| 2,660,382 A | 11/1953 | Wilson |
| 2,988,292 A | 6/1961 | Bliss |
| 3,039,707 A | 6/1962 | Beck et al. |
| 3,215,405 A | 11/1965 | Walsh |
| 3,319,070 A | 5/1967 | Schneider |
| 3,524,606 A | 8/1970 | Coski |
| 3,670,988 A | 6/1972 | Leonard |
| 3,776,315 A * | 12/1973 | Gill et al. .................. 33/366.24 |
| 3,902,701 A | 9/1975 | Orme |
| 4,002,321 A * | 1/1977 | Shaw et al. ................ 242/399.2 |
| 4,022,391 A | 5/1977 | Stein et al. |
| 4,027,399 A * | 6/1977 | Armstrong et al. ........ 33/366.24 |
| 4,132,004 A * | 1/1979 | Deschenes et al. ........ 33/366.24 |
| 4,535,955 A | 8/1985 | Custer |
| 4,695,010 A | 9/1987 | Smith |
| 4,838,500 A | 6/1989 | Graham |
| 4,928,904 A * | 5/1990 | Watts ......................... 242/478.2 |
| 5,078,333 A | 1/1992 | Hester |
| 6,505,791 B1 | 1/2003 | Syndikus et al. |
| 6,811,112 B1 | 11/2004 | Currie et al. |
| 6,929,210 B2 | 8/2005 | Sandler et al. |
| 2005/0144795 A1* | 7/2005 | Tanner ........................ 33/366.24 |
| 2010/0201970 A1* | 8/2010 | Pellen ........................... 356/138 |

* cited by examiner

*Primary Examiner* — Yaritza Guadalupe-McCall
(74) *Attorney, Agent, or Firm* — Graybeal Jackson LLP; Kevin D. Jablonski

(57) ABSTRACT

A method and system for monitoring a fleet-angle of a cable. An embodiment may monitor the fleet-angle of a cable being spooled or unspooled in multiple radial directions and without use of a mechanical monitoring apparatus. The method and system may employ a fleet angle sensor device having a bell-shaped aperture across which propagate one or more collimated light beams that may be used to detect excessive fleet-angle of the cable. The light beams may be generated by a fleet-angle sensor disposed in the fleet angle sensor device proximate to the aperture. Various light-beam patterns within the aperture may provide different advantages when determining deviations of the cable from the aperture center axis.

33 Claims, 5 Drawing Sheets

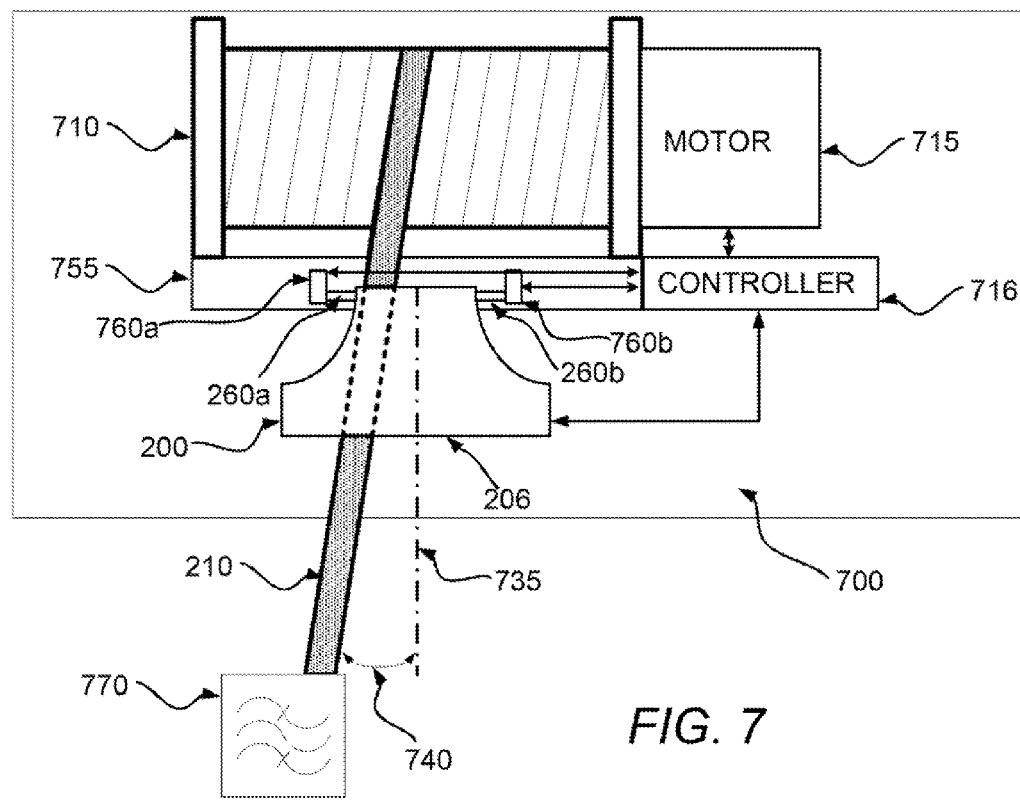
FIG. 7
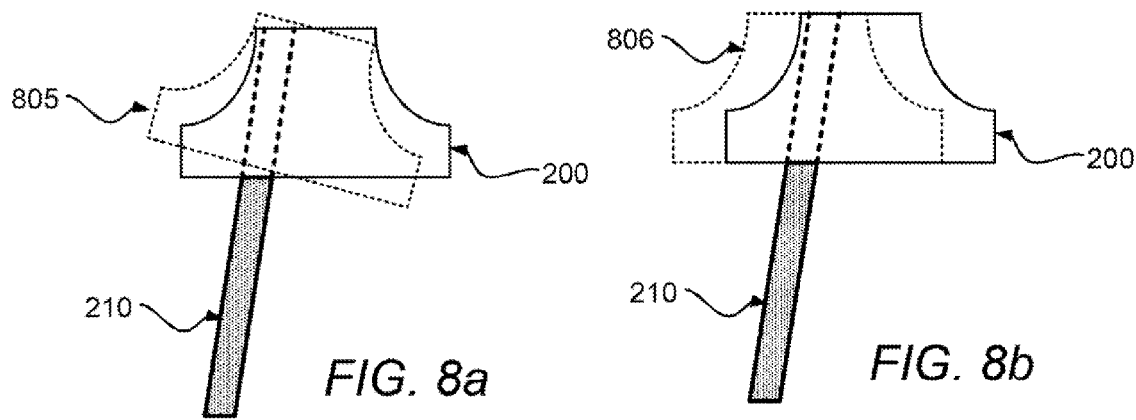
FIG. 8a
FIG. 8b

CABLE FLEET ANGLE SENSOR

BACKGROUND

Devices and equipment that may be deployed from a control vehicle or base station to a remote location to gather data and information may be tethered to the control vehicle or base station. Such tethering may be in the form of a power/data cable that may include electrical control wiring and data communication wiring such that a controller may send control signals to the remote device and receive data signals from the remote device. Various forces acting on the remote device (as well as on the cable itself) may result in an excessive tensile force that may damage or break the cable and in some applications prevent alignment of the control vehicle with the base station. Such forces may include wind, drag through a fluid such as water, and forces imparted by a motor that is spooling or unspooling the cable from a drum.

When deploying or retracting a remote device, a system may monitor the fleet-angle of the cable. "Fleet-angle" is a term used to describe the angle between the center axis of alignment (i.e., where the cable would hang straight down if no other force other than gravity were acting upon it) and the cable. By maintaining an acceptable fleet-angle, excessive tensile forces on the cable may be prevented. Accordingly, damage to the cable through misalignments may be avoided."

BRIEF DESCRIPTION OF THE DRAWINGS

One or more embodiments of the subject matter disclosed herein will become more readily appreciated as the same become better understood by reference to the following detailed description, when taken in conjunction with the accompanying drawings.

FIG. 7 is a diagram of an embodiment of a device-deployment system that may include one or more of the fleet angle sensor devices of FIGS. 2-6.

FIG. 8a is a diagram of an embodiment of a fleet angle sensor device of FIG. 2 having an adjustable angle when a threshold fleet-angle is, determined.

FIG. 8b is a diagram of an embodiment of a fleet angle sensor device of FIG. 2 having an adjustable lateral position when a threshold fleet-angle is determined.

DETAILED DESCRIPTION

The following discussion is presented to enable a person skilled in the art to make and use the subject matter disclosed herein. The general principles described herein may be applied to embodiments and applications other than those detailed above without departing from the spirit and scope of the subject matter disclosed herein. This disclosure is not intended to be limited to the embodiments shown, but is to be accorded the widest scope consistent with the principles and features disclosed or suggested herein.

By way of overview, in an embodiment, a method and system may monitor the fleet-angle of a cable being spooled or unspooled in multiple radial directions and without use of a mechanical monitoring apparatus. The method and system may employ a fleet angle sensor device having a bell-shaped aperture across which propagate one or more collimated light beams that may be used to detect the fleet-angle of the cable. The light beams may be produced by collimated light sources such as lasers disposed proximate to the aperture of a bell shaped fleet angle sensor device. Various light-beam patterns within the aperture may provide different advantages when determining deviations of the cable from the aperture center axis.

Figure 1:
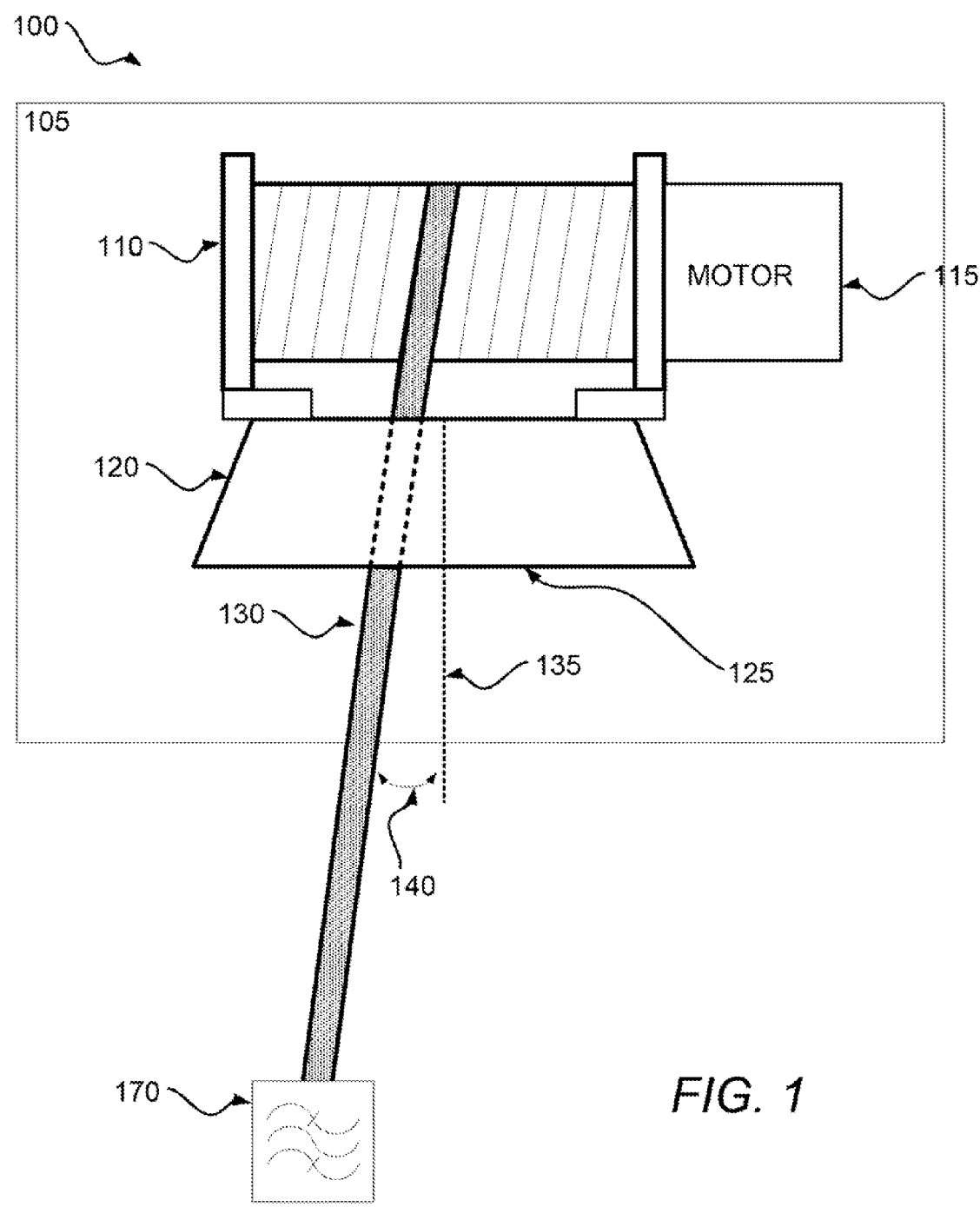
FIG. 1 is a diagram of an embodiment of a system for deploying and retracting a device tethered to a cable.

FIG. 1 shows a system 100 that includes a deployment system 105 for deploying a remote device 170 tethered to a cable 130. The remote device 170 may be, for example, a sonar carrying towed body that may be deployed in the ocean from a ship or helicopter (not shown). In addition to the cable 130, the deployment system 105 includes a motor 115 for rotating a cable drum 110 about which the cable is spooled, and an alignment device 120 that aligns the cable approximately perpendicular to the rotational axis of the cable drum 110 as the remote device 170 is deployed or retracted (and the cable is unwound or wound about the drum). Such an alignment device 120 may include a bell-shaped mouth 125, which may be conical in shape and resemble the bell of a trumpet. When the cable 130 is spooling in or out of the deployment system 105, the bell-mouth 125 may prevent the cable from rubbing up against any sharp edges (such as from a corner of the drum assembly) as may be experienced without the alignment device 120.

When deploying or retracting the device 170, the system 100 may monitor the fleet-angle 140 of the cable 130. "Fleet-angle" 140 is a term used to describe the angle between the center axis 135 of the alignment device 120 and the cable 130. For example, an acceptable fleet-angle 140 that avoids excessive tensile force on the cable 130 or excessive misalignment between alignment device 120 and remote device 170, may be a fleet-angle that is less than approximately 25°."

The system 100 may monitor the fleet-angle 140 of the cable 130 with a mechanical sensor (not shown) that determines when the cable deviates too far laterally from the axis 135. But the mechanical sensor may be able to monitor the fleet-angle 140 in only a single radial direction from the axis 135. Therefore, if the cable 130 exceeds a maximum allowable value of fleet-angle 140 in a radial direction that the mechanical sensor cannot detect, the cable 130 may experience excessive force or allow excessive misalignment. Furthermore, a mechanical fleet-angle sensor may be unsuitable for applications in which the alignment device 120 is immersed in a liquid such as water (e.g., if the system 100 an underwater vehicle). This is because the water may cause corrosion, loss of lubrication, or other problems that may cause the mechanical sensor to fail. In addition, the mechanical sensor can sense the cable 130 only when the cable contacts the sensor, this contact may wear or otherwise damage the sensor, the cable, or both the sensor and the cable. As such, mechanical means of determining a cable fleet-angle may have drawbacks.

Figure 2:
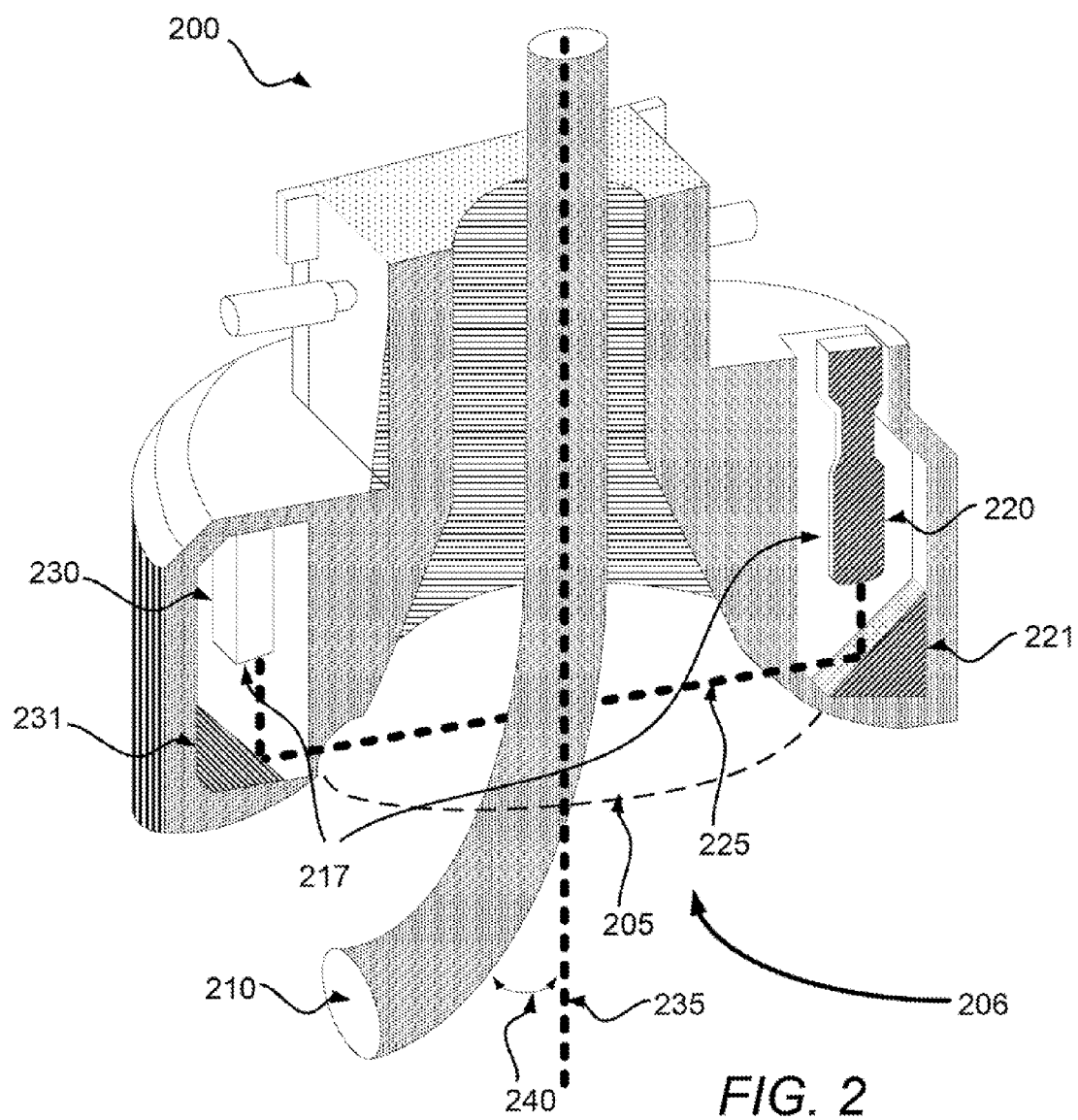
FIG. 2 is a cut-away isometric view of an embodiment of a fleet angle sensor device.

FIG. 2 is a cut-away isometric view of an embodiment of a fleet angle sensor device 200 having a sensor 217 that uses one or more light beams for detecting the position of a cable 210, and thus for monitoring a fleet-angle 240. The fleet angle sensor device 200 may be part of an overall system for deploying and retracting a cable-tethered remote device (not shown in FIG. 2) from/to e.g., a water-born vessel, platform (such as an oil-drilling platform), or a fixed structure. An example of such an overall system is described below in conjunction FIG. 7.

The fleet angle sensor device 200 may use one or more collimated light sources 220 (e.g., laser light sources) aligned with a corresponding one or more optical receivers 230 (e.g., photo-transistors detectors). Only one light source 220/receiver 230 combination is shown in FIG. 2 for ease of illustration, however. Each light source 220 may produce a beam of light 225 that may be reflected by one or more reflectors (such as reflectors 231 and 221 to be directed across an aperture 205 as defined by a housing (i.e., the fleet angle sensor device as described further below) and eventually to be received by the receiver 230.

The aperture 205 may be circular and lie in a plane that is perpendicular to a center axis 235 of the bell-mouth opening 206 through which a cable 210 may extend. Such a circular opening may be defined by a housing that may include a fleet angle sensor 217. As was discussed above in conjunction with FIG. 1, one may use the axis 235 as a reference for measuring the fleet-angle 240 of the cable 210 as it exits the bell-mouth opening 206. Further, the walls of the bell-mouth opening 206 may be tapered parabolically so as to reduce the forces, and thus reduce the likelihood of damaging, the cable 210 if it contacts the walls of the bell-mouth opening while it is being spooled or unspooled.

With one or more light sources 220 casting respective light beams 225 across the aperture 205, detection of excessive fleet-angle 240 may be determined as a function of which beams 225 are interrupted by the cable 210 and which beams are not interrupted. Thus, in the example of FIG. 2, the light beam 225 will be interrupted by the cable 210 when the cable intersects any point along the path of the light beam. By logically interpreting the combination of signals from receivers 230 that receive a respective light beam 225, the relative position of the cable 210 within the aperture 205, and thus excessive fleet-angle 240, may be determined.

As discussed below in conjunction with FIGS. 3-6, a number of possible geometric combinations of light beam sources 220 and receivers 230 may be used to cover different parts of the aperture 205 so as to provide an indication of where the cable 210 intersects the plane of the aperture 205 relative to the center axis 240, and, thereby, to detect excessive fleet-angle 240. Further, various combinations of light beam sources 220 and light beam receivers 230 (i.e., a source/receiver tandem) may also be in different planes. For example, a first source/receiver tandem may be aligned in a first aperture plane that is perpendicular to the axis 235 as is shown in FIG. 2. Additionally, a second source/receiver tandem (not shown) may be aligned in a plane slightly tilted in one direction (e.g., sloping downward from left to right) while another source/receiver tandem may be aligned in yet another plane tilted in another direction (e.g., sloping downward from left to right).

If the determined fleet-angle 240 exceeds a specified maximum value, then the drum assembly (not shown in FIG. 2) may take corrective action to reduce potentially damaging stress on the cable 210 or correct the misalignment between the base station and the remote station to ensure proper operation. Examples of such corrective action may include changing the spooling or unspooling speed of the drum about which the cable is wound, and changing the orientation or position of bell-mouth opening 206.

Figure 3:
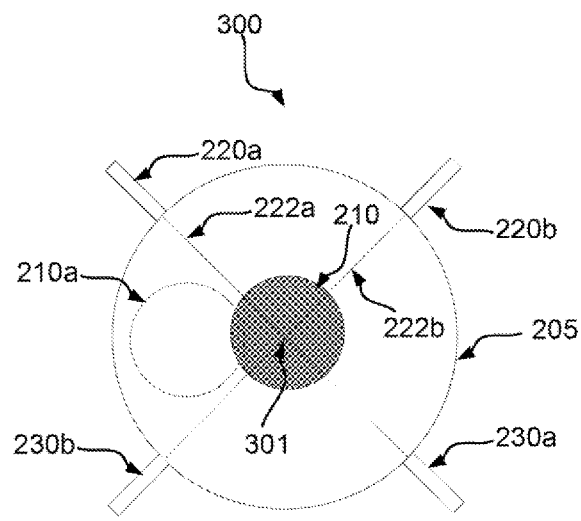
FIG. 3 is an axial view with portions broken away of an aperture of an embodiment of the fleet angle sensor device of FIG. 2.

FIG. 3 is a top-view of the aperture 205 of an embodiment of the fleet angle sensor device 200 of FIG. 2 across which two perpendicular light beams 222a and 222b may be generated that intersect at the center 301 of the aperture. More specifically, the two light beams 222a and 222b are generated, respectively, by light sources 220a and 220b which may be positioned 90° apart (with respect to the circumference of the aperture 205) such that light beams may intersect at a 90° angle at the center 301 of the aperture. In reciprocal positions, light receivers 230a and 230b are positioned on opposite sides of the aperture 205 to receive the light beams if not interrupted (e.g., by the cable 210).

With this configuration, the cable 210, when in a centered position (e.g., normal position) will always interrupt both of the light beams 222a and 222b (as is Shown in FIG. 3). However, as the cable 210 deviates in any radial direction, either one of the lights beams 222a or 222b may no longer be interrupted and its respective light receiver 230a or 230b may then receive a respective light beam. This may be indicative of when the cable deviates far enough to trigger a control action. That is, as soon as the cable 210 moves far enough (for example, to position 210a), at least one of the two light beams 222a or 222b will no longer be interrupted (in the example of position 210a, both light beams are no longer interrupted), and thus, received by one of the receivers 230a or 230b which may be interpreted as an indication that the cable 210 has reached threshold fleet-angle. When this is determined, an overall system may compensate or respond accordingly which is discussed below with respect to FIG. 7.

Figure 4:
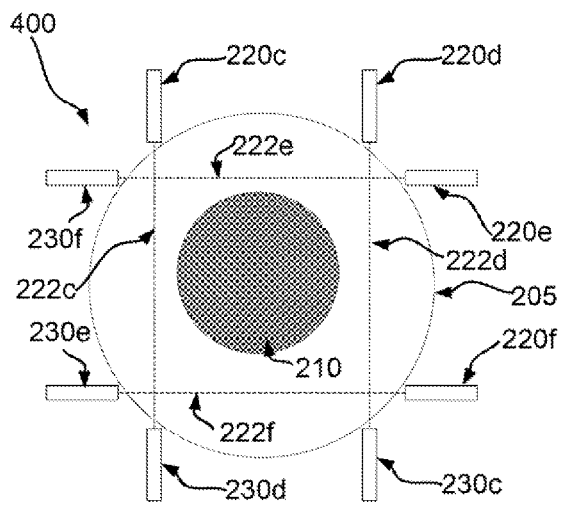
FIG. 4 is an axial view with portions broken away of an aperture of another embodiment of the fleet angle sensor device of FIG. 2.

FIG. 4 is a top-view of the aperture 205 of an embodiment of the fleet angle sensor device 200 of FIG. 2 having four collimated light beam 222c-f in square pattern or secant pattern. The four light beams are generated, respectively, by light sources 220c-f which may be reciprocally positioned in tandem with four light receivers 230c-f, respectively. The four light beams 222c-f form secants within the aperture. That is, the four light beams 222c-f form the sides of a square within the aperture 205.

With this configuration, each of the four light beams 222c-f may normally be received by a respective receiver 230c-f unless interrupted by the cable 210. Therefore, when none of the light beams 222c-f is interrupted, this indicates that the cable is within the included area formed by the light beams, and that the maximum fleet-angle has not been exceeded. Therefore, the included area may be referred to as an acceptable zone through which the cable 210 may extend without corrective action being taken. But when the cable 210 deviates far enough in one direction, one of the four light beams is interrupted, and this interruption indicates that the cable has exceeded the specified maximum fleet-angle. That is, the cable 210 has breached the boundary of the acceptable zone. Alternatively, additional (or fewer) light-source 220 and receiver 230 pairs may be included to provide a different shape (e.g., triangular, hexagonal, or octagonal) for the acceptable zone.

Figure 5:
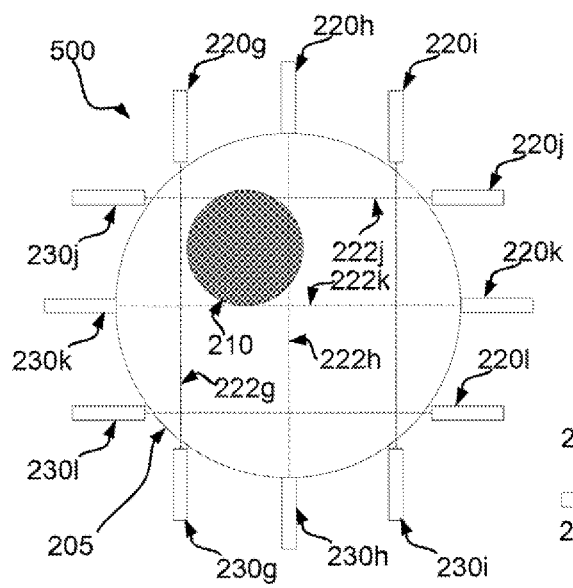
FIG. 5 is an axial view of with portions broken away of an aperture of another embodiment of the fleet angle sensor device of FIG. 2.

FIG. 5 is a top-view of the aperture 205 of the fleet angle sensor device of FIG. 2 having a plurality of collimated light beams (for example, light beams 222g, 222h, 222j, and 222k) in a grid pattern according to an embodiment of an invention disclosed herein. In this grid pattern, light beams (for example, light beams 222g and 222h) may be generated in parallel columns, respectively, by light sources 220g-i in a vertical manner (with respect to this top-view) and received, in tandem, by light receivers 230g-i. Similarly, light beams (for example, light beams 222*j* and 222*k*) may be generated in parallel rows, respectively, by light sources 220*j-l* in a horizontal manner (with respect to this top-view) and received, in tandem, by light receivers 230*j-l*. With these columns and rows of light beams, the respective light beams form a grid of light beams disposed within the aperture 205. In this embodiment, three columns and three rows are shown, but other embodiments may include more than three columns and rows of light beams.

With this configuration, each light beam interrupted by the cable 210 may be interpreted accordingly and the position of the cable may be deduced by which of the light beams in the grid are interrupted. For example, the cable 210 as shown in FIG. 5 interrupts light beam 222*h* and 222*j*. An interruption of the light beam 222*h* (and subsequently the non-interruption of light beam 222*g*) indicates that the cable 210 has not yet deviated far enough in the horizontal direction to be considered at a threshold fleet-angle. However, because the light beam 222*j* is interrupted (and consequently, the light beam 222*k* is received by its respective light receiver 230*k*) this is an indication that the cable has deviated far enough in the vertical direction to reach (or surpass) a threshold fleet-angle. Of course, the different combinations of light beam receivers 230 that receive a respective light beam 222 may be interpreted to indicate which direction the cable is deviating within the aperture 205. The more light source 220—light receiver 230 tandems there are, the more accurate the determination can be with regard to the cable's position.

Thus, when the cable 210 deviates far enough in one direction, specific light beams further from the center may be interrupted which may be interpreted as an indication that the cable is approaching or has reached a maximum fleet-angle or a threshold fleet-angle. In other embodiments not shown, additional (or fewer) light source 220 and receiver 230 pairs may be included to provide additional data about a more exact location of the cable 210 within the aperture 205.

Figure 6:
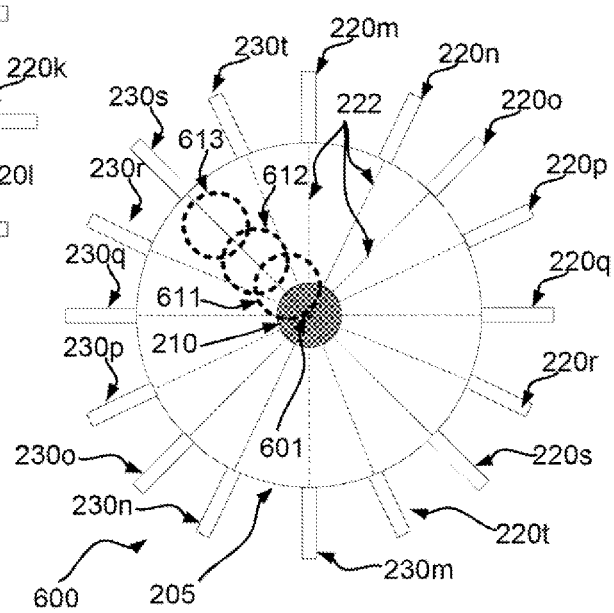
FIG. 6 is an axial view with portions broken away of an aperture of another embodiment of the fleet angle sensor device of FIG. 2.

FIG. 6 is a top-view of the aperture 205 of the fleet angle sensor device of FIG. 2 having a plurality of collimated light beams 222 in a centered geometric pattern (sometimes called hub and spoke) according to an embodiment of an invention disclosed herein. In this embodiment, a plurality of light beams (collectively labeled 222 in FIG. 6) may be generated, respectively by light sources 220*m-t* which may be positioned at equal angles (with respect to the circumference of the aperture 205) apart from each other such that light beams may intersect at the center 601 of the aperture 205. In a reciprocal configuration, light receivers 230*m-t* are positioned on respective opposite sides of the aperture 205 to receive the light beams if not interrupted (e.g., by the cable 210).

With this configuration, the cable 210, when centered or near centered (as is shown in FIG. 6) each of the light beams 222 is interrupted. As the cable deviates in any direction (as indicated by the dotted-line cables of FIG. 6), at least one of the several light beams 222 will be able to indicate when the cable 210 deviates far enough in any direction. That is, as soon as the cable 210 deviates far enough from the center point 601, at least one of the light beams 222 will no longer be interrupted, and thus, received by one of the receivers 230*m-t* which may be interpreted as an indication that the cable 210 has reached a specific fleet-angle.

For example, as the cable 210 deviates to the first dotted-line cable position 611, only one light beam (the light beam generated by light source 220*o*) is received by its respective receiver 230*o*. As the cable deviates further to dotted-line position 612, more light beams are no longer interrupted (in this example, beams received by receivers 230*m*-230*p*). Finally, the cable may deviate all the way toward a single light source 220 or receiver 230 such that only the light beam between these two is interrupted. For example, if the cable deviates to position 613, the only the light beam between light source 220*s* and 230*s* is interrupted which may indicate that the cable has reached a maximum fleet-angle. At any combination of receivers 230 receiving light beams 222, a threshold fleet-angle may be determined, and the system may compensate or respond accordingly.

Additional light beam patterns are contemplated but not discussed further. The fleet angle sensor device discussed above with respect to FIGS. 2-6 may be deployed in a larger system for monitoring the fleet-angle of a number of different cabling applications. The following paragraphs discuss these various applications.

FIG. 7 is a block diagram of a device-deployment system 700 including a fleet angle sensor device 200 having one of the aperture beam patterns of FIGS. 3-6 according to an embodiment of the subject matter disclosed herein. The device-deployment system 700 may be part of a larger system, such as a water-born vessel, underwater vehicle, fixed structure or aircraft as discussed further below with respect to FIG. 8.

The device-deployment system 700 may include a motor 715 for rotating a cable drum 710 to spool or unspool the cable 210 from the drum. The fleet angle sensor device 200 may assist with aligning the cable 210 with the cable drum 710 as the cable 210 and attached device 770 is deployed or retracted. Thus, when a cable 210 is spooling in or unspooling out of the cable drum 710 through the fleet angle sensor device 200, the bell-mouth 206 assist with preventing damage to the cable 210 from external forces. That is, by monitoring, the fleet-angle through the fleet angle sensor device, e.g., via one of the various embodiments described above with respect to FIGS. 3-6, control parameters (for example, motor speed, or the physical position of the fleet angle sensor device 200) may be adjusted as the determined fleet-angle approaches or exceeds a threshold fleet-angle. Two examples of such adjustments are discussed further below with respect to FIGS. 8*a* and 8*b*.

As discussed above with respect to FIGS. 2-6, the fleet angle sensor device 200 may include one or more light sources and light receivers tandems (not shown in FIG. 7) that use one or more beams of collimated light to monitor the position of the cable 210 within an aperture 205 of the bell-mouth 206 of the fleet angle sensor device 200. The fleet angle sensor device 200 may be coupled to a controller 716, such that logical signals from the light receivers in the fleet angle sensor device 200 may be communicated to the controller 716. The controller 716 may be a logical state-machine or other similar processor that is operable to receive logical signals (e.g., a "1" corresponding to a voltage or a "0" corresponding to no voltage). Such a controller may process or logically determine specific output parameters based upon the logical signal level of respective inputs that correspond to each coupled light beam receiver 230.

Based upon the combination of logical signals received, the controller 716 may adjust various operational parameters of the device-deployment system 700 in response to the detected position of the cable 210. That is the controller 716 may deduce a fleet-angle of the cable 210 based upon which specific logical signals (corresponding to various light beams received at various receivers) are received. Then, various aspects of the operation of the device-deployment system 700, such as motor speed, may be changed to compensate for detecting an excessive fleet-angle.

As a first example, if the controller 716 determines that a threshold fleet-angle has been reached by the cable 210 within the fleet angle sensor device 200, the controller 716 may adjust the speed of the motor 715. In one embodiment, the speed of the motor 715 may be discretely adjusted lower at the detection of a maximum fleet-angle reached by the cable 210. For example, if the cable interrupts one beam of light in the secant-square embodiment of FIG. 4, then the motor speed may be cut to half-speed or even stopped altogether. In a different embodiment, the speed of the motor 715 may be gradually reduced as the controller 716 determines that the fleet-angle continues to get larger, e.g., if specific grid line beams further from a center point of the bell-mouth are interrupted in the embodiment of FIG. 5.

Further yet, the detection of an excessive fleet-angle may simply stop the motor 715 altogether or trigger a control alarm (not shown) such that an operator may be alerted to the problem. Additional motor 715 control scenarios are contemplated but not discussed further.

In another operational control example, the controller 716 may adjust the physical angle of the fleet angle sensor device 200 with respect to the cable drum 710. FIG. 8a is a diagram of an embodiment of a fleet angle sensor device of FIG. 2 having an adjustable angle when a threshold fleet-angle is determined. Thus, as the fleet-angle may be determined to be exceeding an acceptable angle in a specific radial direction, the entire fleet angle sensor device 200 may be radially moved in that direction. For example, with additional reference to FIGS. 4 and 7, the fleet angle sensor device 200 may be attached to the cable drum 710 on a mounting bracket 755 having engagement mounts 760a and 760b that may engage the fleet angle sensor device at respective interface mounts 260a and 260b. The controller 716 may position the engagement mounts 760a and 760b radially, such that the vertical center-line of the fleet angle sensor device rotates away from its original axis. Thus, if the controller 716 determines that the fleet-angle is at a threshold angle because a specific light beam 222c-222f or combination thereof has been interrupted (shown in FIG. 4), the controller 716 may rotate the entire fleet angle sensor device 200 toward the direction of the excessive fleet-angle to position 805 as shown in FIG. 8a to alleviate the excessive fleet-angle.

Several logical combinations may be possible in this example as well. Using the example of FIG. 4, if only one light beam, e.g., 222c, is interrupted, the fleet angle sensor device may be rotated in the one direction (e.g., a horizontal direction toward light beam 222c. If two light beams are interrupted, e.g., 222c and 222e, the fleet angle sensor device may be rotated partially in both directions toward light beam 222c and 222e i.e., diagonally encompassing both directions. With different light beam configurations, different logical combination may determine different rotation scenarios as may be appropriate.

In yet another operational control example, the controller 716 may adjust the physical positioning of the fleet angle sensor device 200 with respect to the cable drum 710. FIG. 8b is a diagram of an embodiment of a fleet angle sensor device of FIG. 2 having an adjustable lateral position when a threshold fleet-angle is determined. Thus, as the fleet-angle may be determined to be exceeding an acceptable angle in a specific lateral direction, the entire fleet angle sensor device 200 may be laterally moved in that direction. For example, with additional reference to FIGS. 4 and 7, the controller 716 may position the engagement mounts 760a and 760b in a lateral direction back and forth across the traverse of the cable drum 710. Thus, if the controller 716 determines that the fleet-angle is at a threshold angle because a light beam 222c or 222d has been interrupted (shown in FIG. 4), the controller 716 may move the entire fleet angle sensor device 200 toward the direction of the excessive fleet-angle to position 806 as shown in FIG. 8b to alleviate the excessive fleet-angle.

Furthermore, as the lateral position of the fleet angle sensor device 200 may already be moving because of cable drum 710 winding requirements, another control option is to adjust the rate of change in one direction or the other. For example, if the fleet angle sensor device 200 is already moving in a direction toward the excessive fleet angle, the speed in which the fleet angle sensor device is already moving may be increased to help compensate. Vice versa, if the excessive fleet angle is toward the opposite direction, the speed of the lateral motion of the fleet angle sensor device 200 may be reduced to help compensate. For Any number of other control aspects may be implemented at the detection of exceeding a maximum allowable fleet-angle but are not discussed further.

Figure 9:
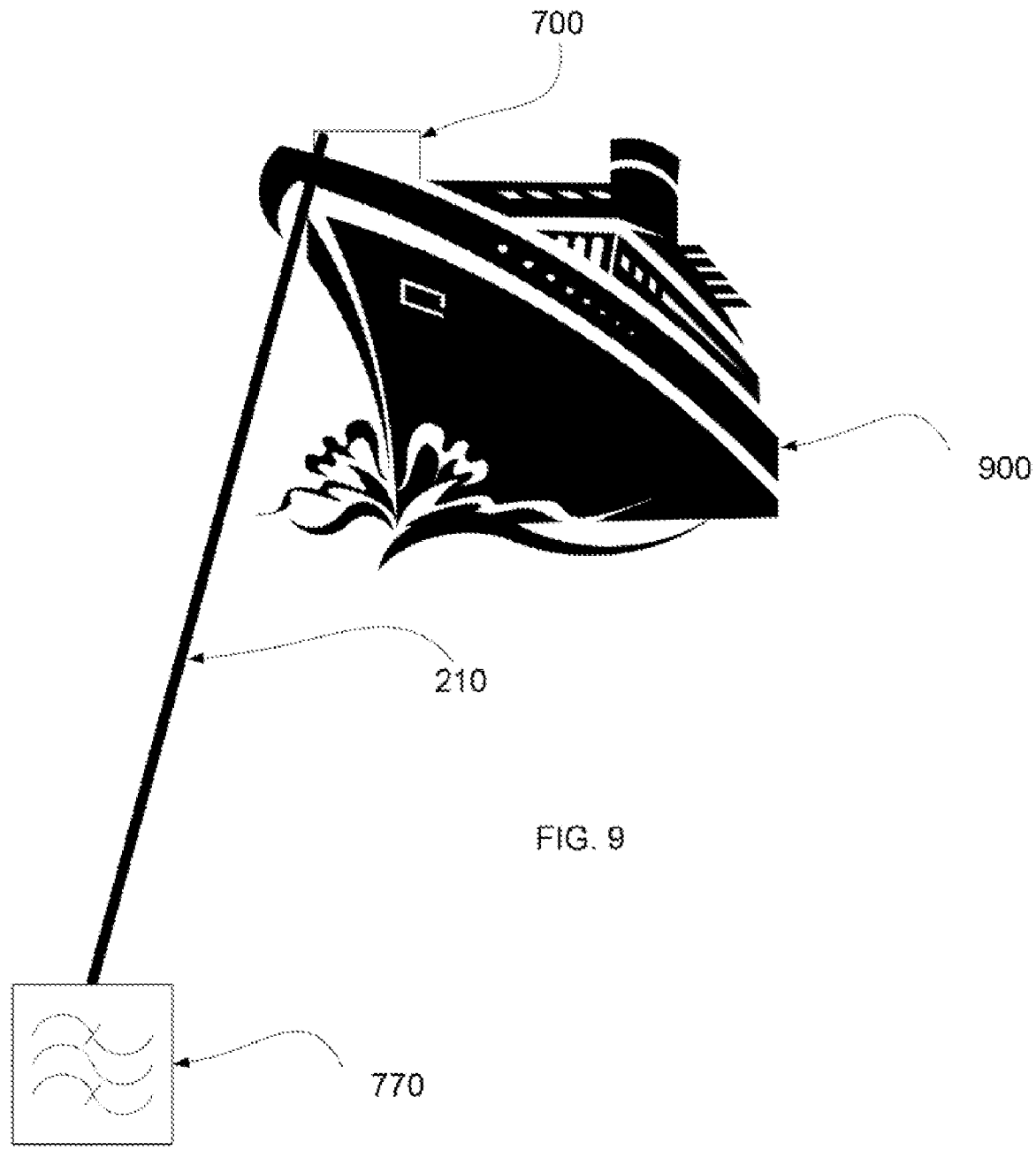
FIG. 9 is a diagram of an embodiment of a device-deployment system of FIG. 2 that is part of a larger system, such as a water-born ship.

FIG. 9 is a diagram of an embodiment of a device-deployment system of FIG. 2 that is part of a larger system 900, such as a water-born ship. The system may include an overall system 900, such as a ship, base station or aircraft, that includes a device-deployment system 700 having a cable 210 attached to a deployable device 770. Several embodiments involving differing overall systems 900 and differing device-deployment systems 770 are discussed in the following paragraphs.

As discussed briefly above, the remote device 770 may be any number of devices that may be used to gather data. In this manner, the cable 210 may typically include wiring for sending and receiving data to and from the remote device 770. In a first example, the remote device may be a sonar detection device that may be deployed from a water-born vessel or helicopter. In a different example, the remote device 770 may be a seismic acoustic array that may be towed from an oil exploration ship. In essence, any remote device 770 that may be deployed from a set location (water-born vessel, aircraft, construction crane, offshore platform, etc.) may be used within the deployment system of FIG. 7.

Further, the remote device 770 may be a remotely-operated vehicle, such as an exploration unit or tunnel-boring device. In such examples, the cable 210 may then also include electrical power transmission cable as well as control wiring for remotely controlling the maneuvering and operation of the remotely-operated vehicle 770. Such a cable 210 may often be referred to as an umbilical cable when the remote device 770 is a remotely-operated vehicle and may also include or comprise fiber-optic cabling. Further yet, the remote device 770 may simply be an object requiring no electrical power or communication whatsoever, such as with an anchor, or line riser. In this case, the cable 210 may simply be an anchor cable, line riser, or tow cable having no internal electrical wiring.

The device-deployment system 700 may be installed in any other suitable larger system 900, several examples of which are discussed below.

The water-born vessel 900 may be, e.g., a submersible vehicle, a surface vessel, or any other water craft that may use a remote-operated device 770 or any other object that may be tethered via a cable 210. With such a water-born system 900, the remote-operated device 770 may be an unmanned submersible exploration vehicle, and the like. With these water-born vessels 900, the nature of using an fleet angle sensor device 200 having light sources and light receivers is particularly well-suited for marine use because such a device-deployment system 700 may be deployed under water and still maintain correct operation. Further, with no moving parts, such a device deployment system 700 (having a fleet angle sensor device 200 of FIG. 2) is also well-suited for more volatile and higher-vibration environments.

As alluded to above, the suitable system 900 of FIG. 9 may be an entirely different system other than a water-born vessel within which the device-deployment system 700 may operate.

As a first set of examples of different larger systems, the system 900 may be a tug boat operable to tow another water-born vessel, such as another ship or an offshore drilling platform. The fleet-angle of a tow cable may be monitored with the device-deployment system 700 and the operational parameters controlled accordingly. Other vessels, stations or vehicles for pulling, lifting or towing may also use the device-deployment system 700 such as a ski-lift tow cable system, a construction crane, a winch disposed on a land-based vehicle, water-craft, or aircraft, a cable or flexible-pipe laying water-born vessel, etc.

As a second set of examples, of different larger systems, the system 900 may be an offshore oil drilling platform wherein the fleet-angle of anchor lines holding the platform in place may be monitored. Further, the system 900 may be a Floating Production Storage and Offloading (FPSO) terminal also having anchoring lines and line risers such that the fleet-angle of the anchor lines and riser angles are monitored. Further, various tension cables that hold additional equipment and systems in place may also be monitored by a fleet-angle sensor according to embodiments described herein.

While the subject matter discussed herein is susceptible to various modifications and alternative constructions, certain illustrated embodiments thereof are shown in the drawings and have been described above in detail. Furthermore, those skilled in the art will understand that various aspects described in less than all of the embodiments may nevertheless, be present in any embodiment. It should be understood, however, that there is no intention to limit the subject matter to the specific forms disclosed, but on the contrary, the intention is to cover all modifications, alternative constructions, and equivalents falling within the spirit and scope of the subject matter disclosed.

What is claimed is:

1. A fleet-angle sensor, comprising:
an aperture configured to receive a cable; and
more than two light sources operable to direct light along beam paths extending across the aperture, the beam paths oriented at a non-zero angle relative to one another at each respective source.

2. A fleet-angle sensor comprising:
an aperture configured to receive a cable;
a first light source aligned with a first receiver and operable to direct a first beam of light across the aperture and toward the first receiver, such that if the cable interrupts the first beam of light, the first receiver indicates the interruption; and
a second light source aligned with a second receiver and operable to direct a beam of light across the aperture and toward the second receiver, such that if the cable interrupts the second beam of light, the second receiver indicates the interruption.

3. The fleet-angle sensor of claim 2 wherein the aperture includes a geometrical center, and the first beam of light and the second beam of light are approximately mutually perpendicular to and intersect the geometrical center of the aperture.

4. The fleet-angle sensor of claim 2 wherein the first beam of light and the second beam of light are approximately parallel to each other and propagate on a secant line within the aperture.

5. The fleet-angle sensor of claim 2 wherein the first and second light sources and the first and second light receivers are positioned at equal circumferential distances within the aperture.

6. The fleet-angle sensor of claim 2 wherein the light source comprises a collimated laser light source.

7. The fleet-angle sensor of claim 2, further comprising:
a plurality of additional light sources, each operable to direct light along respective beam paths across the aperture.

8. The fleet-angle sensor of claim 7 wherein the plurality of additional light sources produce respective beams of light within the aperture in a grid pattern.

9. The fleet-angle sensor of claim 8 wherein the grid pattern comprises at least two sets of parallel beam paths, the sets being mutually perpendicular, the distance between each parallel beam being less than a diameter of a cable positionable within the aperture.

10. The fleet-angle sensor of claim 7 wherein the plurality of additional light sources produce respective beams of light within the aperture in a spoke pattern such that each beam of light intersects a geometrical center of the aperture.

11. An apparatus, comprising:
a fleet angle sensor device having a bell-mouth with a center-line extending along an axis of the bell-mouth and configured to receive a cable; and
a fleet-angle sensor coupled to the bell-mouth, comprising:
an aperture configured to receive the cable; and
more than one light source configured to direct light along beam paths extending across the aperture, the beam paths oriented at a non-zero angle relative to one another.

12. The apparatus of claim 11, further comprising:
a motor coupled to a cable drum configured to extend and retract a cable extending through a fleet angle sensor device; and
a controller coupled to the motor configured to adjust the operation of the motor in response to the cable deviating from the center-line.

13. The apparatus of claim 11, further comprising:
a motor coupled to a cable drum configured to extend and retract a cable extending through a fleet angle sensor device; and
a controller coupled to the motor configured to adjust the position of the fleet angle sensor device in response to the cable deviating from the center-line.

14. The apparatus of claim 11 wherein the bell-mouth further comprises an expanding parabolic portion that the cable is not contacting as the cable is extended and retracted.

15. An apparatus, comprising: a fleet angle sensor device having a bell-mouth with a center-line extending along an axis of the bell-mouth and configured to receive a cable; and
a fleet-angle sensor coupled to the bell-mouth, comprising:
an aperture configured to receive the cable;
a first light source aligned with a first receiver and operable to direct a first beam of light across the aperture and toward the first receiver, such that if the cable interrupts the first beam of light, the first receiver indicates the interruption; and
a second light source aligned with a second receiver and operable to direct a beam of light across the aperture and toward the second receiver, such that if the cable interrupts the second beam of light, the second receiver indicates the interruption.

16. A method for determining a fleet-angle, comprising:
directing a plurality of light beams within an aperture of a fleet angle sensor device, wherein at least two of the light beams are oriented at a non-zero angle relative to one another;
passing an elongated object through the aperture; and
determining a fleet-angle of the elongated object based upon an interruption of one or more of the plurality of light beams.

17. The method of claim 16, further comprising adjustably controlling a speed of the elongated object as it passes through the aperture based upon the determination of the fleet-angle.

18. The method of claim 16, further comprising adjusting an angle of the aperture based upon the determination of the fleet-angle.

19. The method of claim 16, further comprising directing light beams in the aperture to form a pattern including a grid pattern, a centered geometric pattern, a tangential square pattern, and a perpendicular centered-cross pattern.

20. The method of claim 16, further comprising determining that the fleet-angle exceeds a pre-determined fleet-angle threshold.

21. The method of claim 16, further comprising actuating an alarm if the calculated fleet-angle exceeds a pre-determined fleet-angle threshold.

22. The method of claim 16 wherein passing the elongated object through the aperture further comprises feeding a tow cable attached to an object being towed through the aperture.

23. The method of claim 16 wherein passing the elongated object through the aperture further comprises feeding a power/control cable attached to remotely operated device through the aperture to a cable drum.

24. The method of claim 16 wherein passing the elongated object through the aperture further comprises feeding an anchor cable attached to an anchor through the aperture to a cable drum.

25. The method of claim 16 wherein passing the elongated object through the aperture further comprises feeding a flexible pipeline through the aperture to a drum for storing flexible pipeline.

26. A system, comprising:
a structure suitable for deploying a remote device having a tethered cable;
a device-deployment apparatus disposed on the structure, comprising:
an fleet angle sensor device having a bell-mouth with a center-line, the fleet angle sensor device configured to receive a cable; and
a fleet-angle sensor coupled to the bell-mouth, comprising:
an aperture operable to receive the cable; and
more than one light source configured to direct beams of light across the aperture, wherein at least two of the light beams are oriented at a non-zero angle relative to one another.

27. The system of claim 26 wherein the remote device comprises a remotely-operated vehicle.

28. The system of claim 26 wherein the remote device comprises an oil-exploration probe.

29. The system of claim 26 wherein the remote device comprises an anchor line for an exploration-platform.

30. The system of claim 26 wherein the structure comprises a water-borne vessel.

31. The system of claim 26 wherein the structure comprises a water-borne platform.

32. The system of claim 26 wherein the structure comprises a cable-laying vessel.

33. The system of claim 26 wherein the structure comprises a Floating Production Storage and Offloading (FPSO) terminal.

* * * * *